United States Patent
Gupta et al.

(10) Patent No.: US 10,258,196 B2
(45) Date of Patent: Apr. 16, 2019

(54) HEAT EMITTING PAN LID WITH PROTECTIVE INNER SHIELD

(71) Applicants: Chhavi Gupta, Tampa, FL (US); Sanjiv Sahoo, Tampa, FL (US)

(72) Inventors: Chhavi Gupta, Tampa, FL (US); Sanjiv Sahoo, Tampa, FL (US)

(*) Notice: Subject to any disclaimer, the term of this patent is extended or adjusted under 35 U.S.C. 154(b) by 0 days.

(21) Appl. No.: 15/903,083

(22) Filed: Feb. 23, 2018

(65) Prior Publication Data

US 2019/0059654 A1    Feb. 28, 2019

Related U.S. Application Data

(63) Continuation-in-part of application No. 15/686,190, filed on Aug. 25, 2017, now Pat. No. 9,930,990.

(51) Int. Cl.
| | |
|---|---|
| *A47J 36/06* | (2006.01) |
| *A47J 37/10* | (2006.01) |
| *A47J 36/34* | (2006.01) |

(52) U.S. Cl.
CPC .............. *A47J 37/103* (2013.01); *A47J 36/34* (2013.01)

(58) Field of Classification Search
CPC ........................ A47J 36/06; A47J 37/10; A47J 37/101–37/108; A47J 27/00; A47J 27/08
USPC ....... 219/385, 386, 387, 476, 477, 478, 479, 219/480; 99/372, 374–382
See application file for complete search history.

(56) References Cited

U.S. PATENT DOCUMENTS

| | | | |
|---|---|---|---|
| 2,361,285 A * | 10/1944 | Gough ................. | A47J 37/0611 99/331 |
| 2,538,567 A | 1/1951 | Jones | |
| 3,243,576 A | 3/1966 | Lee | |
| 3,410,981 A | 11/1968 | Martin | |
| 3,850,331 A | 11/1974 | Oxel | |
| 4,134,004 A * | 1/1979 | Anderson ................ | A21B 1/52 219/202 |
| 4,663,508 A | 5/1987 | Ishimura | |
| 5,138,938 A * | 8/1992 | McClean ............. | A47J 37/0611 219/386 |
| 6,414,274 B1 | 7/2002 | Mahyari | |
| 6,578,569 B2 | 6/2003 | Liese | |
| 9,466,195 B1 | 10/2016 | Boyer | |
| 2007/0261567 A1 | 11/2007 | Morgan | |
| 2014/0216269 A1 | 8/2014 | Cooley | |
| 2015/0230659 A1 | 8/2015 | Hoare | |

* cited by examiner

*Primary Examiner* — Michael A Laflame, Jr.
(74) *Attorney, Agent, or Firm* — Larson & Larson, P.A.; Justin P. Miller; Frank Liebenow

(57) ABSTRACT

The disclosed device is a heat-emitting lid for use on top of a standard cooking pan. The device comprises a body including a heat element that radiates heat downward during use. By radiating heat downward, the food item within the pan may be cooked or browned more evenly by heating simultaneously from the top and bottom. A transparent plate protects the heating element from contamination by the food cooking within the pan.

17 Claims, 6 Drawing Sheets

HEAT EMITTING PAN LID WITH PROTECTIVE INNER SHIELD

CROSS-REFERENCE TO RELATED APPLICATION

This application is a continuation-in-part of pending U.S. patent application titled Heat Emitting Pan Lid, Ser. No. 15/686,190 filed Aug. 25, 2017.

FIELD

This invention relates to the field of cookware and more particularly to a heat-emitting lid for a pan.

BACKGROUND

Stoves and hotplates are used around the world for the preparation of food. All suffer from the common shortcoming of only heating food items from the bottom, and never from the top.

As a result, food within a pan must be flipped to cook the top side. For example, omelets, pancakes, or eggs. These foods do not always flip cleanly, and thus ultimately the food suffers.

Other foods, such as pizza, cannot be properly cooked in a pan as flipping causes the food to fall apart.

What is needed is a device that can be placed on top of a conventional, common cooking pan or electric skillet, allowing one to cook the top of any food placed within the pan, and as a result, cooking food more quickly without the need to stir or flip the food.

SUMMARY

The disclosed device is for use on top of a standard pan, the device including a heat element that radiates heat downward during use. By radiating heat downward, the top of any food item within the pan is cooked or browned.

The heat-emitting pan lid has two primary parts, a body and a handle. The body includes a top surface that is preferably flat, allowing the heat-emitting pan lid to be set on a countertop upside down.

The top surface connects to a side surface, forming an outer shell that holds the majority of the components of the body. The interior of the body may also be referred to as a cavity, into which the other components are placed.

Within the body is a heating element, which serves as the source of heat to cook any food item within the pan.

The heating element may be an electrical heating coil, an electrical heating disc, or an infrared bulb.

In the preferred embodiment, the heating element is a heating coil formed from a resistance element that generates heat when current is passed through it. For example, a nichrome 80/20 heating element formed from 80% nickel, 20% chromium. Alternative materials may also be used.

In an alternative embodiment, the heating element is a bulb that emits infrared light, such as a quartz heat lamp or halogen heat lamp.

Beneath the heating element is a protective transparent plate formed from a heat-tempered glass-ceramic material, or similar material, that permits the passage of heat. The transparent plate, or panel, or sheet, protects the heating element from damage, as well as from being contaminated by contact with food.

The glass-ceramic layer is removable to allow for easy cleaning. A fixed latch and movable latch interact to hold the glass-ceramic layer in place during use, and allow for its removal for cleaning.

Above the heating element is an inner layer of material, a layer of thermal insulation, and finally an outer layer. The outer layer forms the upper surfaces.

The thermal insulation reduces the transmission of heat from the heating element upward, toward the top of the device. By reducing the flow of heat upward, the device is made more efficient to avoid wasting heat, as well as safer by preventing burns.

The inner layer of material is optional. If the inner layer is excluded, the heating element may be immediately followed by a layer of insulation. If an inner layer of material is used it is preferably a material reflective to heat, such as a reflective foil or polished metal.

Optionally protruding through the body is a one-way steam vent. The one-way steam vent allows the pressure of steam to escape the pan and lid without the steam lifting the lid.

Protruding from the body is a handle. The handle has a grip, for placement of a user's hand, and a cord with plug to provide power.

On the body, or the handle, the device includes switch for actuation by the user with on and off positions. The switch may be a simple toggle switch, or it may be combined with an adjustment knob that allows the user to select a heat setting.

In addition to a manual on and off switch, the device may have one or more automatic switches. Such automatic switches include: a plunger switch; a tilt, or mercury, switch; a timer; and a flame detector.

A plunger switch is optionally placed under the handle. The plunger switch is depressed when the device is removed from the pan and placed on either the counter or a trivet. When depressed, the plunger switch deactivates the heating element.

An optional tilt switch, or mercury switch, may also be installed within the device. When the device is flipped on its top for placement on the counter, the tilt switch removes power from the heating element. The tilt switch may be mechanical, using a mercury blob or a rolling metal ball, or solid state, using a purpose-built computer chip.

The device may further include a timer, whereby power is removed from the heating element if the power switch is left in its on position for a period of time, e.g., thirty minutes.

Finally, the device may include a flame detector. The flame detector may work by detecting light or heat.

If the flame detector is set up to detect light, it works as follows: When the device is in place on top of a pan, the interior of the pan is dark. If a fire starts within the pan the resulting light can be detected by a light sensor, indicating a fire. The device can then disable the heating element. The sensor is preferably set to actuate only above a certain threshold of light to avoid false actuation.

If the flame detector is set up to detect heat, a high-temperature setting may be used to disable the heating element. For example, when the temperature within the pan exceeds 500 degrees Fahrenheit.

Additionally, the use of the lid decreases the risk of fire by enclosing the food item within the pan and thus decreasing the supply of oxygen. As a result, the risk of fire is reduced.

The disclosed device fits on top of a standard pan, sitting on top of the upper rim of the pan.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
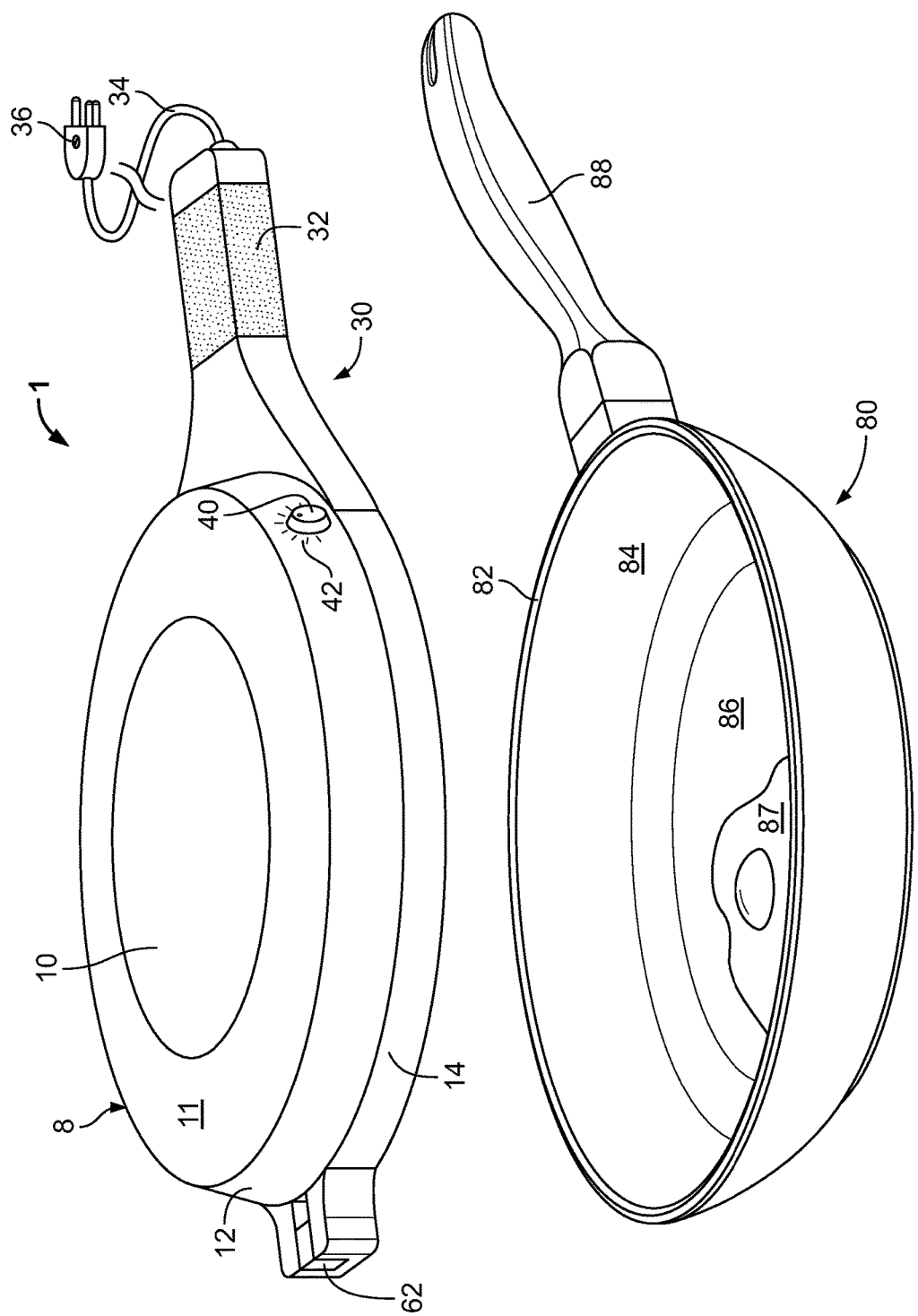
FIG. 1 illustrates an upper isometric view of a first embodiment of the device over a conventional pan.

Reference will now be made in detail to the presently preferred embodiments of the invention, examples of which are illustrated in the accompanying drawings. Throughout the following detailed description, the same reference numerals refer to the same elements in all figures.

Referring to FIG. 1, an upper isometric view of a first embodiment of the device over a conventional pan is shown.

The heat-emitting pan lid 1 is formed primarily of a body 8 and handle 30. The body 8 includes a top surface 10, which is preferably flat to keep the pan stable if set on a counter upside down. The top surface 10 connects to a secondary top surface 11, then a tapering surface 12, which in turn connects to a side surface 14. In alternative embodiments the top surface 10 connects directly to the side surface 14.

The handle 30 includes a grip 32, with a cord 34 and plug 36. The handle 30 provides a protected means for the cord 34 to reach the heating element (discussed below).

Also shown is an optional temperature adjustment knob 40 with a scale 42 molded or etched into the tapering surface 12.

The movable latch 62 is also shown, which will be addressed in further detail below. The indentation for placement of a user's figure is shown.

The sample pan 80 is shown, with rim 82 connected to side 84, in turn joined to base 86. Handle 88 connects to the base 86. The food 87, shown as an egg, sits on top of the base.

Figure 2:
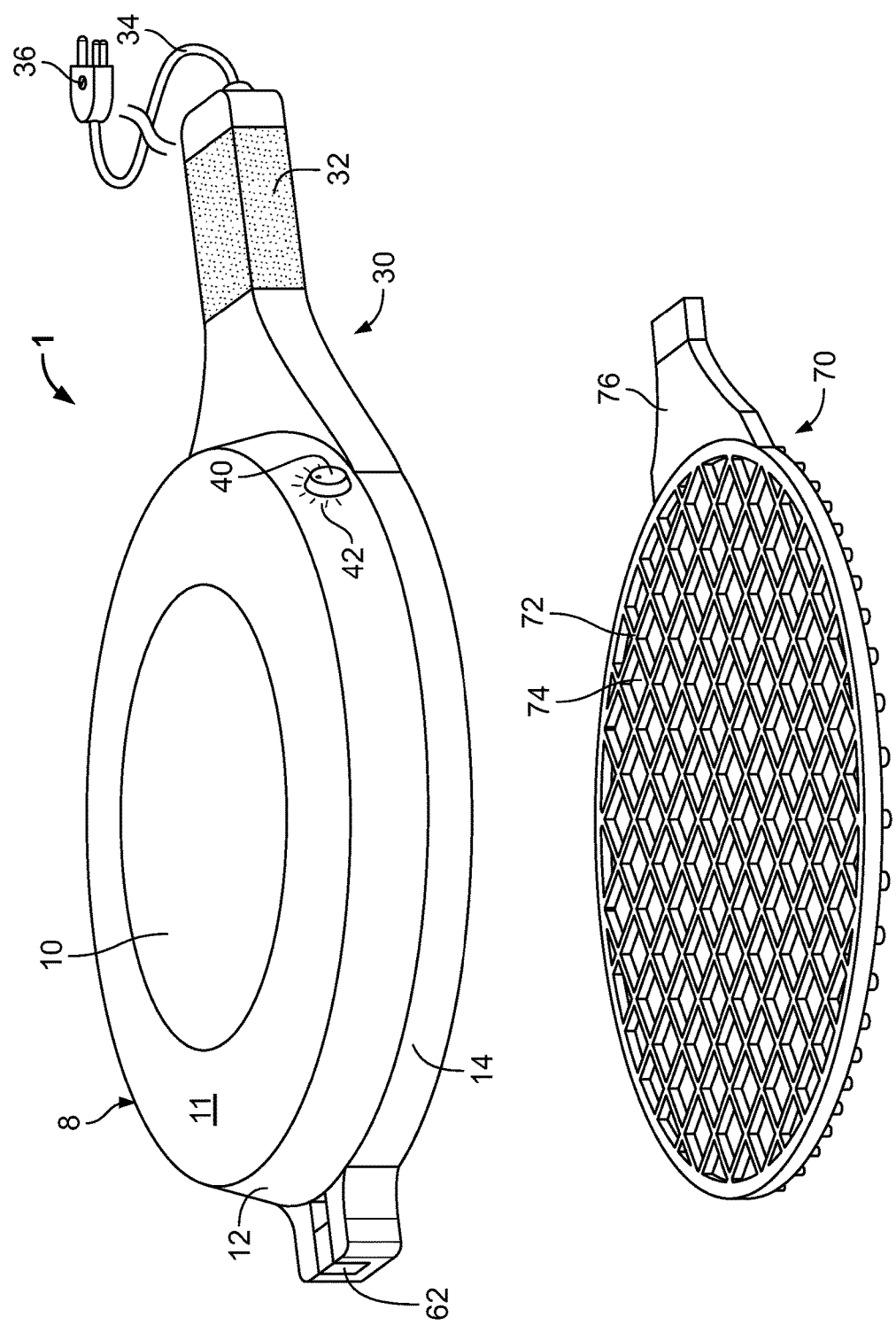
FIG. 2 illustrates an upper isometric view of a first embodiment of the device over a matching trivet.

Referring to FIG. 2, an upper isometric view of a first embodiment of the device over a matching trivet is shown.

When the heat-emitting pan lid 1 is removed from the pan 80, a user will need a place to set the lid 1 without causing damage to the countertop. An optional accessory to the heat-emitting pan lid 1 is a trivet 70. The trivet is shown in an optional waffle configuration, with ridges 72 and air gaps 74, creating an insulated layer between the heat-emitting pan lid 1 and the countertop.

The trivet 70 is constructed of any thermally insulating material, such as silicone, wood, certain thermal-set plastics, and so forth.

Included as part of the trivet 70 is a switch actuation surface 76. The switch actuation surface 76 provides a surface to activate a plunger-type auto-shutoff switch 44, discussed further as part of FIG. 3.

Figure 3:
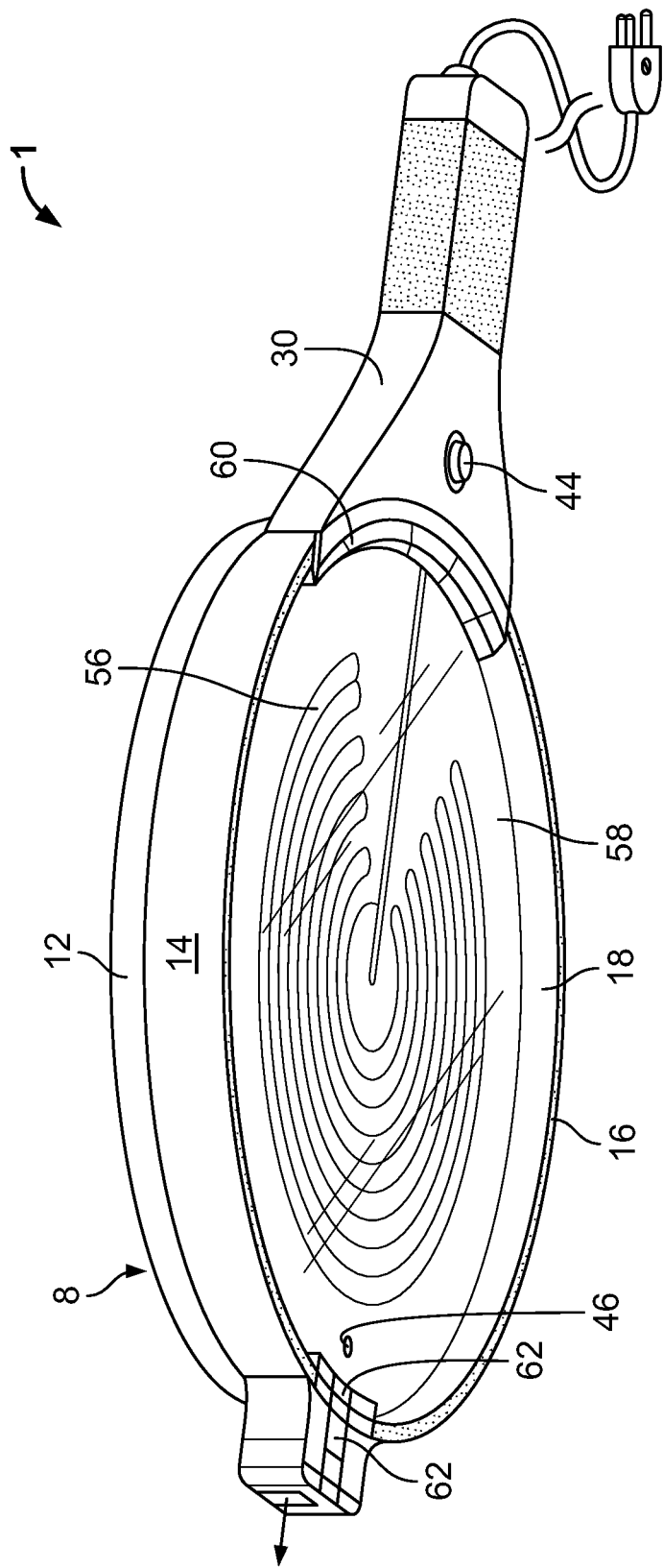
FIG. 3 illustrates a lower isometric view of a first embodiment of the device.

Referring to FIG. 3, a lower isometric view of a first embodiment of the device is shown.

The bottom rim 16 of the body 8 is shown, with interior lower rim 18 that is intended to surround the top of the pan 80.

A selection of the optional safety mechanisms is visible, including the auto-shutoff switch 44, light sensor 46, and latching mechanism comprised of the fixed latch 60 and movable latch 62.

The moveable latch 62 slides away from the body 8 in order to disengage the transparent plate 58. This releases one edge of the transparent plate 58, allowing for its removal.

Within the body 8 the heating element 56 is visible beneath the transparent plate 58. The heating element 56 sits within the space, or cavity, created within the body 8.

Figure 4:
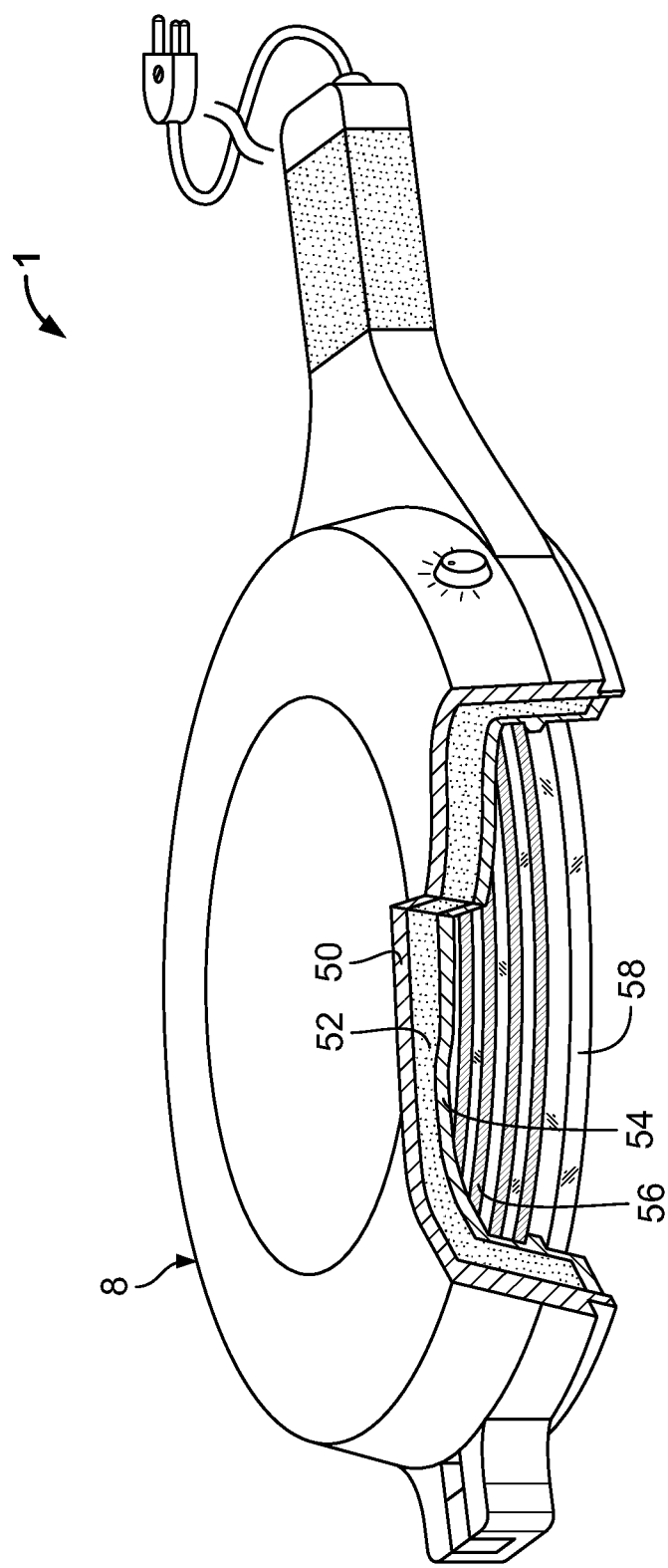
FIG. 4 illustrates a partial cross-sectional view of the first embodiment of the device.

Referring to FIG. 4, a partial cross-sectional view of the first embodiment of the device is shown.

The outer layer 50 and optional inner layer 54 are shown, with a sandwiched insulation layer 52.

Moving down within the base 8, next is the heating element 56 and transparent plate 58.

Figure 5:
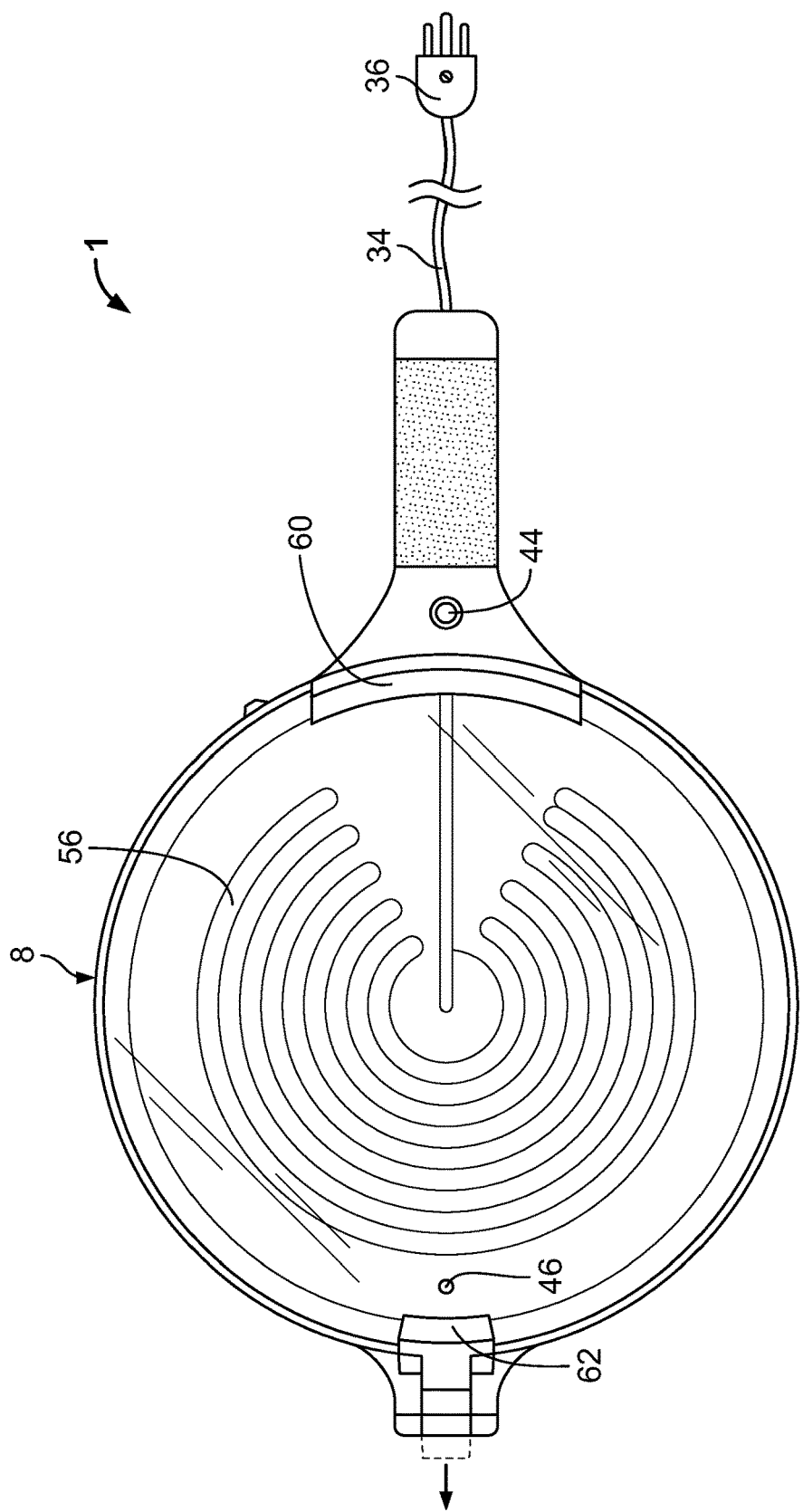
FIG. 5 illustrates a bottom view of the first embodiment of the device.

Referring to FIG. 5, a bottom view of the first embodiment of the device is shown.

The heating element 56 is visible, as are the fixed latch 60 on the right and movable latch 62 on the left. Their function is discussed further below.

The light sensor 46 is also visible.

Figure 6:
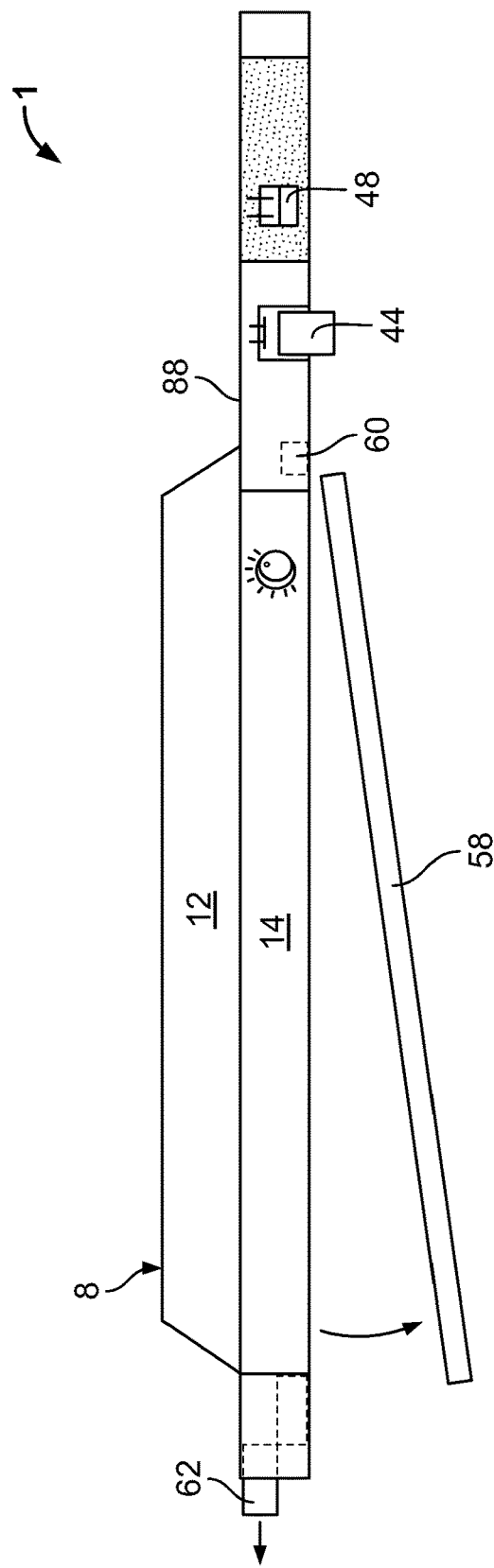
FIG. 6 illustrates a side view of the device with the transparent plate being removed.

Referring to FIG. 6, a side view of the device, with the transparent plate being removed, is shown.

The fixed latch 60 and movable latch 62 are shown locked around the lip 83 of the pan 80. When engaged, the latches 60/62 hold the transparent plate 58 in place.

The figure shows removable latch 62 in its open position, which allows one edge of the transparent plate 58 to disengage from the body 8, allowing the transparent plate 58 to be removed for cleaning.

Also shown are side views of the auto-shutoff switch 44 and tilt switch 48.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A heat-emitting lid for use with a conventional cooking pan to cook food, the heat-emitting lid comprising:
    a body formed from:
        a top surface;
        a side wall having:
            a top edge and a bottom edge, the top edge of the side wall attached to the top surface and extending downward to form a cavity;
        an insulated layer configured to prevent the top surface from heating;
        a heating element positioned within the cavity;
        a transparent plate affixed within the cavity, the transparent plate separating the heating element from the food;
        the side wall extending beyond the transparent plate, forming a lower rim;

the transparent plate formed from a heat-tempered glass-ceramic material;
a handle affixed to the body;
a power switch with an on position and an off position, the on position activating the heating element and the off position de-activating the heating element;
a fixed latch adjacent to the lower rim; and
a sliding moveable latch adjacent to the lower rim;
  the sliding movable latch located across the device from the fixed latch;
  the sliding movable latch sliding with respect to the lower rim;
  wherein the fixed latch supports an end of the transparent plate; and
wherein the movable latch has a first position that supports an end of the transparent plate, and a second position that allows the transparent plate to fully disengage from the lower rim, thus permitting removal of the transparent plate for cleaning;
whereby the lower rim of the side wall is adapted to surround an upper portion of the conventional cooking pan, preventing the heat-emitting lid from sliding off the conventional cooking pan.

2. The heat-emitting lid of claim 1, further comprising:
a plunger switch,
  the plunger switch protruding from a lower surface of the handle;
whereby when the heat-emitting lid is placed on a flat surface, the plunger switch is depressed and the heating element is deactivated.

3. The heat-emitting lid of claim 1, further comprising:
a tilt switch that makes and breaks an electrical circuit based on its rotational position;
whereby when the heat-emitting lid is placed upside down the tilt switch senses the position and deactivates the heating element.

4. The heat-emitting lid of claim 1, further comprising:
a timer;
the timer activated when the power switch is first switched to the on position;
the timer overriding the power switch to deactivate the heating element after the passage of a set period of time.

5. The heat-emitting lid of claim 1, further comprising:
a flame detector;
the flame detector located in optical communication with an interior space created by the combination of the heat-emitting pan lid and the conventional cooking pan;
the flame detector including a light-sensor;
whereby the detection of light in excess of a set value indicates the presence of a fire, triggering the flame detector to disable the heating element.

6. A lid, with a downward-facing heating element, for use on top of a pan, the pan including a rim and an interior, the lid comprising:
an outer layer of a first material, the outer layer forming:
  a top surface connected to a side surface;
  an interior lower rim;
  a bottom rim that bridges the side surface and interior lower rim;
an inner layer of insulation adjacent to the outer layer of a first material;
a downward-facing heating element adjacent to the inner layer of insulation;
a transparent plate that permits the passage of heat from the downward-facing heating element to the interior of the pan while creating a physical separation, thus keeping the downward-facing heating element clean; and
a handle affixed to the outer layer of a first material;
a fixed latch adjacent to the interior lower rim; and
a sliding moveable latch adjacent to the interior lower rim;
  the sliding movable latch located across the device from the fixed latch;
  the sliding movable latch sliding with respect to the interior lower rim;
wherein the fixed latch supports an end of the transparent plate; and
wherein the sliding movable latch has a first position that supports an end of the transparent plate, and a second position that allows the transparent plate to fully disengage from the interior lower rim, thus allowing the transparent plate to be removed for cleaning.

7. The lid of claim 6, wherein the downward-facing heating element is a resistance element formed from a metal wire, whereby passing electric current through the wire results in the generation of heat.

8. The lid of claim 6, further comprising:
a plunger switch,
  the plunger switch protruding from a lower surface of the handle;
whereby when the lid is placed on a flat surface, the plunger switch is depressed and the heating element is deactivated.

9. The lid of claim 6, further comprising:
a tilt switch that makes and breaks an electrical circuit based on its rotational position;
whereby when the lid is placed upside down the tilt switch senses the position and deactivates the heating element.

10. The lid of claim 6, further comprising:
a timer;
the timer activated when the power switch is first switched to the on position;
the timer overriding the power switch to deactivate the heating element after the passage of a set period of time.

11. The lid of claim 6, further comprising:
a flame detector;
the flame detector located in optical communication with an interior space created by the combination of the lid and the pan;
the flame detector including a light-sensor;
whereby the detection of light in excess of a set value indicates the presence of a fire, triggering the flame detector to disable the heating element.

12. A device to fit on top of a pan, the device emitting infrared radiation to cook food within the pan, the device comprising:
a layer of insulation;
a heating element adjacent to the layer of insulation;
a transparent plate adjacent to the heating element;
  the transparent plate formed from a heat-tempered glass-ceramic material;
a first layer of material surrounding the insulation, heating element, and transparent plate without blocking the path of heat from the heating element through the transparent plate;
  the first layer of material extending downward to surround the top of the pan, thereby preventing inadvertent disengagement of the lid from the pan;
a fixed latch adjacent to a lower rim; and
a moveable latch adjacent to transparent plate;

the movable latch located across the heat-emitting lid from the fixed latch;

the movable latch sliding with respect to the transparent plate;

wherein the fixed latch supports an end of the transparent plate; and wherein the movable latch has a first position that supports an end of the transparent plate, and a second position that allows the transparent plate to disengage from the lower rim.

13. The device of claim 12, wherein the heating element is a resistance element formed from a metal wire, whereby passing electric current through the wire results in the generation of heat.

14. The device lid of claim 12, further comprising:

a plunger switch, the plunger switch protruding from a lower surface of a handle;

whereby when the device is placed on a flat surface, the plunger switch is depressed and the heating element is deactivated.

15. The device of claim 12, further comprising:

a tilt switch that makes and breaks an electrical circuit based on its rotational position;

whereby when the device is placed upside down the tilt switch senses the position and deactivates the heating element.

16. The device of claim 12, further comprising:

a timer;

the timer activated when the power switch is first switched to the on position;

the timer overriding the power switch to deactivate the heating element after the passage of a set period of time.

17. The device of claim 12, further comprising:

a flame detector;

the flame detector located in optical communication with an interior space created by the combination of the device and the pan;

the flame detector including a light-sensor;

whereby the detection of light in excess of a set value indicates the presence of a fire, triggering the flame detector to disable the heating element.

* * * * *